J. BJURSTROM.
RETREADING MOLD.
APPLICATION FILED APR. 12, 1919.
1,318,530.
Patented Oct. 14, 1919.
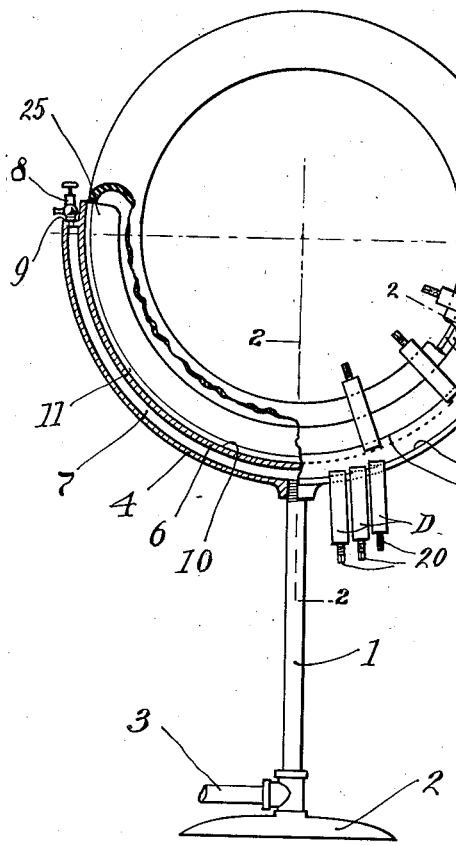
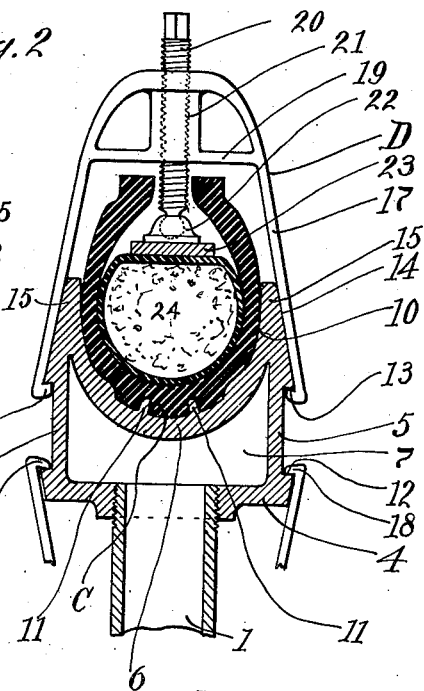
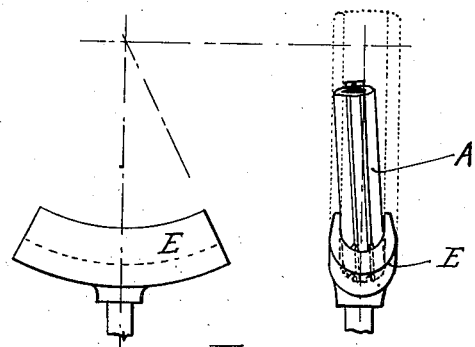
Inventor,
John Bjurstrom
by H. S. Johnson
his Attorney

UNITED STATES PATENT OFFICE.

JOHN BJURSTROM, OF ST. PAUL, MINNESOTA.

RETREADING-MOLD.

1,318,530.           Specification of Letters Patent.      Patented Oct. 14, 1919.

Application filed April 12, 1919. Serial No. 289,501.

*To all whom it may concern:*

Be it known that I, JOHN BJURSTROM, a subject of the King of Sweden, residing at St. Paul, in the county of Ramsey and State of Minnesota, have invented certain new and useful Improvements in Retreading-Molds, of which the following is a specification.

This invention relates to improvements in sectional vulcanizing devices, for retreading automobile tires and the like, and more particularly to that type of vulcanizer apparatus, wherein the mold is of the open top variety, the tire being inserted on edge from above.

In machines of this type, a tire is customarily retreaded in sections, of one-third or one-fourth of the circumference. In either case the mold is required to be a little longer than exactly a third or a fourth. (as the case may be) of the circumferential measurement of the tire so that the sections will overlap at their junctures. This is necessary because the extreme diameters of worn tires vary, and because molds are often used for retreading tires of different standard diameters. Obviously, each overlap is twice subjected to the curing process resulting in a discoloration or overcuring of the overlap, thereby rendering it less durable than the other parts of the tread. It is also very difficult for a workman to correctly judge the length of each section, the overlap of the last section with the first, often appearing excessively large and discolored arousing the suspicion of patrons.

An object of the invention is to provide a mold of the character described, wherein retreading may be completed in two sections obviating the necessity of guessing as to the extent of the overlap.

A further object of the invention is to provide a mold surrounding the lower half of the tire well up to and beyond the center thereof, for the purpose of sustaining the tire against lateral leaning preparatory to clamping. A still further object of the invention is to provide in a device of the character described, means for collectively supporting the clamps when not in use on the main body of the machine.

The invention consists in the features of construction, combination and arrangement of parts, hereinafter described and claimed.

Referring to the drawings:

Figure 1 is a front elvation of a tire vulcanizing mold embodying the invention.

Fig. 2 is an enlarged vertical section on line 2—2 of Fig. 1.

Figs. 3 and 4 are side and end views respectively of a comparatively short sectional mold showing in Fig. 4, an inserted tire leaning sidewise.

Fig. 5 is a plan view of a portion of a rib tread, the rib thereof offset illustrating the result of lateral leaning of the tire before clamping, as illustrated in Fig. 4.

As shown in Fig. 1 A represents an automobile tire positioned in a mold member B which in turn is secured on the top of a pipe standard 1 firmly attached to a base 2. The interior of the pipe standard is in open communication with the branch pipe 3, which latter is provided to be connected with a source of steam supply not shown. The mold member B is semi-circular in form, and rectangular in cross-section at its outer diameter. The outer wall 4 joined at its edges to the parallel disposed side walls 5, and the convex inner wall 6 connecting said side walls, form the steam cavity 7, which latter extends at each of its ends a distance beyond the center of the diameter of the contained tire. A pet cock 8 is provided at each end of the steam cavity and is screw threadedly secured in the shoulder 9 formed by the steam jacket. The inner concave surface 10 of the wall 6 constitutes the molding surface of the mold and is formed in the bottom of its concavity with two spaced circumferential projecting ribs 11, whereby, is formed, on the tire a comparatively wide rib C. The ribs 11 are arranged symmetrically one on either side of the plane in which lies the rim of the tire. Each of the side walls 5 is formed on its outer side with an outwardly extending circumferential shoulder 12 and 13 respectively. From the shoulder 13 the respective outer surfaces 14 of the circular flanges 15, one on either side of, and forming part of the molding surface 10, incline inwardly toward a common center. The clamp D of which there may be any suitable number, comprises side members 17 inclined in the same general direction as are the flanges 15 and adapted to engage the shoulders 13 by means of hooks 18 at the ends of said side members. The side members meet to form a continuous strap and are bridged by a strut 19, to maintain the relative angularity between the two side members. A set screw 20 threaded through a boss 21 integral with said strut and side members, has the usual swivel head 22 which rests on the usual steel pressure distributing band 23, overlying the sand bag 24 within the tire A. By inclining the flanges 15 and side members 17, as shown the pull, when the screw 20 is under stress, is in the direction of said inclination, the flanges resisting the strain edgewise as would the web of a beam. This is an important and novel feature of construction in vulcanizer devices, in that it affords maximum strength in a cast iron mold to resist the great forces set up therein by the firm grip of the clamps. Further, the side members incline toward the center of application of the forces, namely the screw 20, thereby bringing the said members, by means of the strut 19, into direct tension without any bending movement to contend with. By employing this construction the clamps may be made light in weight and capable of withstanding greater strain than is possible with the ordinary clamp. Where the clamps are not in use they may be hung on the shoulder 12 as indicated in Figs. 1 and 2. The pipe standard is in open communication with the steam cavity or jacket.

At each end of the mold B and forming part of the molding surface, is the cold flange extension 25 extending beyond the steam cavity 7 so as to be removed from direct influence thereof. These cold flanges cool and set the heated flowing rubber squeezed upwardly from the mold during the curing process. There is not heat enough to cure this squeezed out rubber, the lap being provided for by the extension of the steam jacket to a point a distance beyond the center of the tire as hereinbefore explained. This arrangement prevents the formation of lumps at the points of juncture of the sections as well as overcured darkened spots on the tire tread.

By employing a half mold, the operator can easily discern in reversing the tire by the aid of the shoulders 9, just how much of a lap is available at each side. The use of a half mold in upright position also prevents offsets in the rib (Fig. 5) which occur when short section molds such as E are used, because of the unavoidable leaning of the tire preparatory to clamping.

I claim:

1. A device of the class described, comprising a semi-circular mold member having on each of its sides and extending circumferentially two concentrically disposed spaced shoulders, and screw clamps having oppositely disposed hooks insertible at the ends of said mold member into said space and adapted to engage either of said shoulders for the purpose set forth.

2. A device of the class described, comprising a semi-circular mold member having a depression throughout its circumferential length in each of its sides, said depression having parallel side walls, and removable screw clamps adapted to straddle said mold and extend into said depression on either side of said mold to engage said walls for the purpose set forth.

3. A device of the class described, comprising a circular tire receiving mold member having a circumferential shoulder one on each of its sides, and a removable screw clamp straddling the concave side of said mold and extending over the sides thereof and around said shoulder, said side extensions of said clamp and said sides of said mold over which said extensions extend, being inclined inwardly toward each other and toward the center of said mold for the purpose set forth.

In testimony whereof I affix my signature in presence of a witness.

JOHN BJURSTROM.

Witness:
GEORGE VOELKER.